United States Patent [19]

Staby

[11] 4,023,308
[45] May 17, 1977

[54] PLANT GROWTH SUBSTRATE AND PROCESS FOR USING

[76] Inventor: George L. Staby, 1170 Slade Ave., Columbus, Ohio 43220

[22] Filed: Oct. 8, 1975

[21] Appl. No.: 620,845

[52] U.S. Cl. .................................. 47/48.5; 47/58; 47/DIG. 4; 47/DIG. 7; 47/DIG. 10
[51] Int. Cl.² ........................................ A01G 29/00
[58] Field of Search ............... 47/1.2, 37, 48.5, 58, 47/DIG. 7, DIG. 4, DIG. 10

[56] References Cited

UNITED STATES PATENTS

| 1,988,307 | 1/1935 | Fay | 47/48.5 X |
|---|---|---|---|
| 2,988,441 | 6/1961 | Pruitt | 47/58 X |
| 3,049,444 | 8/1962 | Palombo | 47/DIG. 7 |
| 3,467,609 | 9/1969 | Adams et al. | 47/37 X |
| 3,812,619 | 5/1974 | Wood et al. | 47/DIG. 7 |
| 3,835,584 | 9/1974 | Shimazu | 47/1.2 X |
| 3,842,537 | 10/1974 | Bishop | 47/37 |
| 3,929,937 | 12/1975 | Clendinning et al. | 47/37 X |
| R25,438 | 8/1963 | Nelson | 47/37 X |

OTHER PUBLICATIONS

Letey, J. et al., 1967 "Limiting Distances Between Root and Gas Phase for Adequate Oxygen Supply" *Soil Science* vol. 103 No. 6 pp. 404–409.
Stolzy, L. H. et al., 1964 "III Correlation of Plant Response to Soil Oxygen Diffusion Rates" *Hilgardia* vol. 35, No. 20, pp. 567–575.
Follett, R. F. et al., 1974, "Distribution of Corn Roots in Sandy Soil with a Declining Water Table" *Agronomy Journal* vol. 66, Mar.–Apr., 1974 pp. 288–292.
Stolzy, L. H. et al., 1964, "Characterizing Soil Oxygen Conditions with a Platinum Microelectrode" *Advances in Agronomy* vol. 16, pp. 249–279.
Spomer, L., Art., 1974, "Demonstration Experiments: Two Classroom Exercises Demonstrating the Pattern of Container Soil Water Distribution" *Hortscience* vol. 9, No. 2, pp. 152 and 153.
Whitcomb, Carl E., 1975 "Drainage Factors in Plant containers" *Florists Review* July 24, 1975.

Primary Examiner—Clifford D. Crowder
Assistant Examiner—James R. Feyrer
Attorney, Agent, or Firm—Sidney W. Millard

[57] ABSTRACT

A process and combination for improving the growth of plants and preventing the plant support medium from retaining too great a quantity of water. A foraminous body is placed in the bottom of the container and prior to the time it is placed therein, it is perforated to form cylindrical conduits vertically completely through the foraminous body wherein the perforations are about 1–5 mm in diameter and are spaced apart about 1–8 mm. Soil is placed on top of the foraminous body, a plant is germinated or planted, watered and fertilized to grow in the container. The water will be retained in the sponge-like foraminous body around the conduits and be available to the plant roots. The conduits themselves will be free of water and will provide a reservoir of oxygen for the roots.

10 Claims, 3 Drawing Figures

PLANT GROWTH SUBSTRATE AND PROCESS FOR USING

BACKGROUND AND SUMMARY OF THE INVENTION

This invention relates to horticultural structures for growing plants, seeds, cuttings and the like. The plant growth structures prepared according to the present invention provide a more optimal relationship between the water, oxygen, carbon dioxide, nitrogen, ethylene and other gases and plant roots. This improved relationship promotes better plant growth and reduces or eliminates the harmful effects due to what is commonly referred to as "over-watering." Over-watering prevents required amount of oxygen from reaching the roots and provides an environment conducive to the growth of certain pathological microorganisms.

It is well known in the art that artificial substrates can be used for the germination, rooting and propagation of horticultural crops. Substrates such as peat, vermiculite, perlite, wood bark, sawdust, certain types of fly ash, pumice, plastic particules, glass wool, organic and inorganic fibers, polyurethane, polystyrene, polyethylene, phenol formaldehyde and urea formaldehyde foams are now commonly used, or have been disclosed in the literature, either alone or in various admixtures with each other and/or soil. Furthermore, certain of these materials, alone or in various combinations, have been converted into rigid, self-supporting or expandable structures that are capable of supporting themselves and the plant without external confinement.

For example, U.S. Pat. No. 3,812,619 granted to Wood et al. on May 28, 1974 describes horticultural foam structures prepared by reacting an isocyanate capped polyoxyethylene polyol reactant with large amounts of an aqueous reactant which may contain seed and/or materials useful or necessary for plant growth. In addition, certain fibers can be converted with the aid of polymeric binders into plant growing structures.

In British Pat. No. 1,134,465, dated Nov. 27, 1968 there is described a plant growth medium molded from polymergrafted cellulose fibers which serves as the sole support and growth medium for propagation and growth of seedling plants and plants from cuttings.

Although these prior art structures are useful and have achieved commercial acceptance in many areas, they do not provide an optimal balance between water and the gases that can significantly influence root and total plant growth. Much experimental evidence has been collected to demonstrate that oxygen is necessary for plant root growth and respiration. The rate of diffusion of oxygen through a reasonably thick layer of water alone is not sufficient to maintain an optimum concentration for proper root growth. L. H. Stolzy and J. Letey have published threatises in (1) *Soil Science*, Vol. 103, No. 6, pages 404–409 in 1967, (2) *Hilgardia*, Vol. 35, No. 20, pages 567–576 in October 1964, and (3) *Advances in Agronomy*, Vol. 16, pages 249–279 in 1964 on the subject of oxygen diffusion rates (ODR) and to the extent necessary for an understanding of this invention such as incorporated herein by reference. The critical ODR value of a substrate below which roots of many plants will not grow is about $20 \times 10^{-8} g\ cm^{-2} min^{-1}$. Clearly, with reduced root growth, foliage and other organ growth will also be retarded. ODR is obviously strongly influenced by air filled voids within the substrate. It is well known that plants growing in such commonly used substrates identified above can, under some conditions, suffer from lack of oxygen and show the symptoms commonly believed to be caused by over-watering, i.e., chlorosis, slow growth, pale color, and even death.

It is the object of the present invention to produce a substrate which eliminates or minimizes the plant growth problems mentioned above. It has been found that plant growth in a substrate such as a synthetic foam, peat or fiber block, pumice and the like can be drastically improved by introducing a plurality of holes or conduits, 1–5 in nominal diameter, extending throughout the substrate, spaced about 1–8 mm, preferably 2–4 mm apart. The conduits will drain water from the substrate and provide reservoirs of oxygen for the plant roots and at the same time the substrate will hold water around the conduits which will be available to the roots. By way of example, a substrate is provided with conduits and placed in a conventional pot. Soil or the like is deposited on top of the substrate and a seed, cutting or small plant is placed in the soil. With the substrate in the pot, over-watering induced problems are virtually prevented. Any excess water will drain from the substrate and out of the opening in the bottom of the pot. Additionally, since water drains from the substrate the conduits will be filled with air and oxygen will be readily available to the roots.

Thus, the invention can be described as a plant growth medium or substrate, capable of absorbing water (and plant nutrients) and containing a plurality of holes, 1–8 mm apart, preferably, but not limited to, holes 2–4 mm apart and about 1–5 mm in diameter, preferably, but not limited to 1–3 mm in diameter. The basic medium or substrate can be composed of synthetic foams such as polyurethane, phenol formaldehyde, urea formaldehyde, polystyrene and the like, fiber structures composed of peat, wood fiber, other natural and synthetic fibers with or without binders, inorganic foams such as pumice, certain types of fly ash, foamed glasses and the like. Various combinations of the above can also function in the described invention.

It is also within the scope of the present invention to include materials such as soils, clay, vermiculite, perlite, bark wood shavings or chips, ion exchange materials, and the like in the preparation of the basic substrate. It is also possible to use particles of these various materials that are bound together in some fashion.

It is further within the scope of the present invention to use a substrate which has a major part of its external surface coated with a film that retards the evaporation of water from the coated surfaces. Such fluid impermeable films are well known and need not be described for an understanding of the invention. Ordinarily, foraminous bodies confined in a container with an overlay of soil would not require a coating but where the substrate stands alone, without soil overlay or surrounding container, the coating may be desirable, but is not absolutely necessary.

It is an object of this invention to produce a plant growth substrate that, upon the addition of water and appropriate nutrients, can be used for the germination of seeds and growth of seedlings, the vegetative propagation and growth of plant material and the growth of plants to maturity or some other stage of growth and development.

It is a further object of this invention to provide a substrate that can be beneficially used in combination with the normal soils, soil mixtures and synthetic medias, such as peat, vermiculite, etc. In particular the hole containing substrates can be used to replace a substantial amount of the soil media in a conventional horticultural container, substantially improve the total water holding ability of the soil media-substrate combination and maintain at the same time a more optimal balance between solids, water and gases.

It is still a further object of this invention to provide a propagation block that allows for more rapid penetration and more homogeneous growth of roots throughout the volume of the propagation block. These roots are consequently better able to use the water contained in the block and thus reduce the frequency of watering and make care of the plant easier. In addition the more homogeneous distribution of roots and their more rapid penetration of the block permits more rapid growth of roots into the soil media after the plants are transplanted. The combination of better water utilization and more rapid growth into the soil reduces problems associated with the commonly observed transplant shock phenomenon.

DESCRIPTION OF THE PREFERRED EMBODIMENTS

For illustrative purposes the preferred embodiment includes a pot with soil therein overlying a foraminous body prepared according to this invention. However, the foraminous body is fully capable of functioning as a growth support substrate without the pot or the soil.

Figure 1:
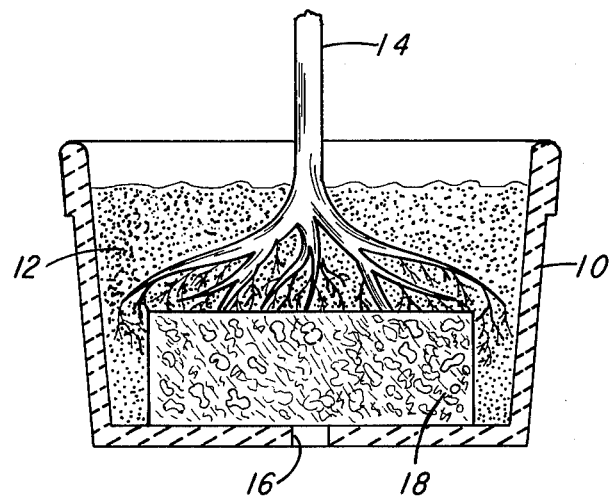
FIG. 1 is an elevation view, partially in section, of a pottery container containing soil and a plant growth substrate and including a plant growing from the soil according to the invention.

Referring to FIG. 1 there is illustrated a conventional flower pot 10 including soil 12 and a plant 14 growing therein. An aperture 16 in the bottom of the pot is conventional.

A rigid foamed substrate 18 lies in the bottom of the pot in easy fluid communication with the aperture 16. Phenol-formaldehyde and urea formaldehyde foams are preferred but other, relatively rigid, substrates of products enumerated herein are acceptable substitutes.

Figure 2:
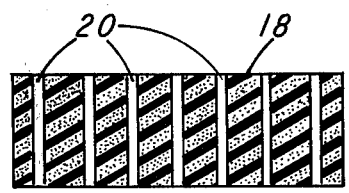
FIG. 2 is a sectional view of the substrate of FIG. 1.
Figure 3:
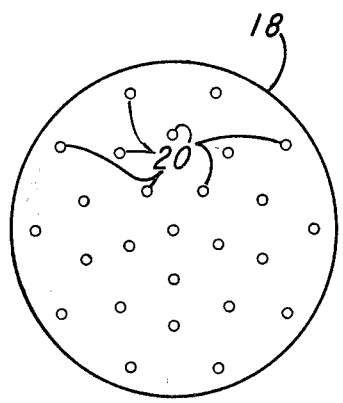
FIG. 3 is a plan view of the substrate of FIG. 1.

As seen in FIGS. 2 and 3 a plurality of conduits 20 extend vertically through the substrate 18. The function of the conduits will be explained subsequently.

A prime problem with growing plants in pots, other sorts of indoor growing containers or even field grown plants is getting adequate water and oxygen to the roots of the plant. For example, where there is no drain hole such as aperture 16 and water is poured into the pot in excessive amounts, it will completely cover the roots and prevent oxygen from reaching the roots. With a drain hole the water may exit through the bottom too quickly making frequent watering necessary. Extensive studies on the oxygen diffusion rates are set out in the above-identified articles by Stolzy and Letey. Proper drainage and adequate air or oxygen to the roots can be assured by placing a formanious, relatively rigid, plant growth substrate in the bottom of the pot with a drain aperture and puncturing the substrate in a plurality of locations. The result will be a plurality of conduits through the substrate and in order to function adequately, the conduits must be of a size such that water will drain from said conduits by gravity. Consequently, the conduits must be large enough that the gravitational force will exceed the force of surface tension. Thus, air will be in the conduits and water in the substrate and such frequent watering is no longer necessary.

The cross-sectional area of the conduit has been found to be critical and it is preferred that the conduits 20 be formed cylindrical although it is not absolutely necessary. Water will drain from or be maintained in the conduits based on, among other things, the surface tension of the water and the length of the perimeter of each of the conduits. It has been found that cylindrical conduits from 1–5 mm in diameter (0.8–19.6 square mm in cross-sectional area) will provide adequate drainage and it is preferred that the conduits be from 1–3 mm in diameter for best results. It is further found that the spacing between the external surface edges of the conduits should be no more than 1–8 mm apart and it is preferred that they be from 2–4 mm apart for best results. From a practical standpoint, for best results the volume of the conduits should be about 6–53% and preferably about 8–26% of the total substrate volume.

The overall concept described herein is not only useful in the manner set out, it is also far superior to the results achieved by conventional methods. More specifically, the process using the foraminous substrate 18 in the combination indicated usually provides faster growing more healthy plants with less needed care. Examples will be given subsequently. The real commercial value of this invention is to provide the potential for a greater number of crops to be grown in certain geographic areas than are presently grown. Also, it improves the keeping quality of home and office plants.

The structures of the present invention may be prepared by a number of methods obvious to those skilled in the art. It is particularly easy to physically punch holes in the rigid but friable foams such as the phenol formaldehyde, urea formaldehyde, certain polyurethanes and certain of the inorganic foams and fiber substrates. An alternate method is to prepare the substrate in a mold which forms the holes during the preparation of the growth substrate. These examples are illustrative only and the invention is not restricted to materials prepared as described above. While it is preferred that the holes extend vertically completely through the substrate, it is however only critical tht the conduits have at least one opening at one of the surfaces that is capable of gas exchange with the atmosphere. As an example, it is within the scope of this invention to use a substrate containing conduits that extend upward from the sides to about the middle of the block.

The structures of the present invention may also contain additives that are useful in the culture of plants, for example, nutrients, hormones, fungicides, bactericides, plant growth regulators, both stimulating and inhibitory, materials with ion-exchange capabilities and the like.

While the invention is not limited thereto, the following specific examples illustrate the invention.

EXAMPLE I

This experiment demonstrates the growth of plants under conditions designed to produce the symptoms commonly referred to as "over-watering" problems.

Blocks of Oasis Floral Foam, a phenol-formaldehyde foam of about 0.026 g/cc bulk density, approximately 10.2 cm × 7.6 cm × 22.9 cm in size, containing holes about 16 mm apart were used as controls. The treatment blocks were prepared from blocks identical to the control blocks except that holes 1-2 mm in size were punched through the block with a wire every 3-4 mm over one of the 10.2 cm × 22.9 cm surfaces. This amounted to approximately 2000 holes over the 234 cm$^2$ area. Patio tomatoes, Black Seeded Simpson lettuce, and Red Cascade petunias were grown in these blocks. In each case a control block and a treatment block were next to each other, separated by approximately 1 cm. The tomatoes and lettuce were grown from seeds placed in a small depression in the blocks, the petunia plants, small but of equal size, were transplanted in small depressions in the blocks. The plants were grown under fluorescent light, 12-16 hrs/day. The temperature of the middle of the blocks was maintained at about 18°-21° C. The blocks were contained in plastic trays with approximately 0.64 to 1.3 cm of water or Peters 20-20-20 nutrient solution in the bottom. This layer of water or nutrient solution was checked daily and replaced as necessary to insure complete saturation of the blocks at all times. Throughout the growth of all three types of plants it was obvious that the ones growing in the blocks containing the multitude of holes 3-4 mm apart, the treatment blocks, were larger and healthier than the ones growing in the control blocks. For example, the tomato plants growing in the control blocks suffered from interveinal chlorosis. The petunia plants suffered symptoms ranging from death through yellowing through interveinal chlorosis. At no time did the plants growing in the treatment blocks show any of these symptoms commonly caused by "overwatering."

The lettuce plants were harvested after about seven weeks. The average fresh weight of the treatment plants was 35.3g. The average for the controls was 12.2. The tomato plants were harvested after about 9 weeks, the average fresh weight for the treatment plants was 48.1g. The average for the controls was 40.6g. These large differences in fresh weight for both tomatoes and lettuce are significant since these plants are not commonly thought to be extremely sensitive to overwatering. The petunias were allowed to grow for 13 weeks. At this point the plants growing in the treatment blocks were large, bushy and about 30-40 cm in height. Most importantly they were healthy in appearance, dark green in color and each has at least two open flowers. The plants growing in the control blocks were small, 8-9 cm in height and approximately 8-9 cm in diameter. The control plants were visibly chlorotic and of a pale color and contained no visible buds or flowers.

The experiments with tomatoes and lettuce were repeated with essentially the same results. Healthier, larger plants were produced in the blocks containing the multitude of holes about 3-4 mm apart.

EXAMPLE II

This experiment describes the superior root growth in and root penetration of the substrate containing holes when cuttings were rooted under conditions optimal for growth in the control substrate, not containing holes. *Fushsia hybrida* cv. Stary Trail cuttings of approximately equal size were taken from stock plants on Feb. 16, 1975, and inserted into Oasis 0.903 propagation blocks. The experiment consisted of four parts: (1) control blocks, as received from the manufacturers, (2) similar blocks but with holes approximately 2-3 mm in diameter every 6-7 mm over the upper surface and extending vertically through to the bottom of the block, (3) similar blocks but with holes approximately 2-3 mm in diameter every 6-7 mm over the surface of one side of the block and extending horizontally through to the other side and (4) similar blocks but with holes approximately 2-3 mm in diameter, every 6-7 mm over the top surface and extending through to the bottom and a similar arrangement of holes on one side extending through to the other side. The plants were grown at approximately 21° C day temperatures under intermittent misting. Proper care was taken to insure that the control blocks were not saturated with water during the growing period. After 20 days each treatment was inspected. It was visually obvious that the growth of roots in the treatment blocks (2), (3), and (4) were much superior in quantity to the growth observed in the control blocks (1). Furthermore, it was apparent that the distribution of roots was much more homogeneous in the treatment blocks (2), (3), and (4) than in the control blocks, that is, the roots grew into and through the treatment blocks, often following the holes. The roots in the center of the treatment blocks had a white color and healthy texture and were fine in structure. In contrast, the roots that did penetrate the inner portions of the control blocks, were darker in color and thicker in structure. Both characteristics are indicative, to those skilled in the art, of roots growing under less than optimum conditions.

EXAMPLE III

This experiment demonstrated the beneficial effects on the keeping quality of chrysanthemum plants brought about through the use of the present invention in combination with a commonly used soil medium. The experiment consisted of two parts: (1) plants grown in normal soil and (2) plants grown in normal soil plus a cylindrically shaped block of phenol formaldehyde resin containing holes approximately 3 mm in diameter and spaced approximately 4-5 mm apart over the top surface and extending through to the bottom of the block. Part (1) constitutes a control for the comparative evaluation of the present invention. The foam blocks used in part (2) were about 11.5 cm in diameter and 4 cm in height. The dry bulk density of the blocks was about 0.02 g/cm$^3$ and each block weighed an average of 8 grams. Each block absorbed (within experimental error) about 305G of water or about 38 times its weight. Standard pots, 16.5 cm size, were filled with a soil mixture composed of 1 part soil, 1 part peat moss and 1 part perlite. The pots for part (1) contained approximately 1150 grams of soil; the pots of part (2) contained the foam blocks in the bottom of the pot and an average of about 910 grams of soil. Five chrysanthemum cuttings were planted in each pot about mid-February 1975. Twelve pots were used for each treatment. The plants were grown in a commercial greenhouse along with a normally scheduled crop, with care being taken to prevent overwatering of the control plants. On May 3, 1975 they were removed and the number of flowers per pot and plant height were measured. There was no difference between (1) and (2) for either parameter. All pots were then watered thoroughly, placed in pairs, consisting of parts (1) and (2), in a number of houses and the time interval to reach wilting was measured for each member of the pair. The plants of part (2) lasted an average of 53% longer before wilting than the control plants of part (1). These date are significant at the 5% confidence level.

A similar experiment was performed at the same time using a control soil media alone and as a treatment, a combination of soil media and identical foam block except that it was without holes. A similar wilting test was carried out. The plants grown in the combination of soil media and intact foam block lasted 15% longer than the plants grown in the soil media. From these data it is clear that the plants grown in a combination of a foam block containing holes and a normal soil media lasted longer and are substantially easier to care for than those grown in soil media alone or soil media and intact blocks.

Having thus described the invention in its preferred embodiment it will become clear to those having ordinary skill in the art that modifications may be made to the structure described without departing from the spirit of the invention. It is not the intention of the inventor to be bound by the language used to describe the invention nor the drawings to illustrate the same. Rather, it is the intention of the inventor to be bound only by the scope of the appended claims.

I claim:

1. A foraminous body for growing plants, said body having the property of absorbing and retaining water, the improvement including means for deriving a proper moisture-to-oxygen balance at the root structure of said plants, said means comprising:
   a plurality of conduits formed in said body, the remaining portions of said body surrounding said conduits being foraminous at least some of said conduits terminating in openings at the surface of said body,
   the cross-sectional area of each said conduit being in the range 0.8 to 19.4 square millimeters,
   the edge of each opening being spaced from the edge of adjacent openings a distance in the range 1–9 millimeters,
   the volume of the conduits being in the range 6–53% of the volume of the body;
   whereby, adequate oxygen and moisture simultaneously are derived at said root structure and plant produced gases are effectively dissipated.

2. The body of claim 1 wherein the foraminous body is composed of material selected from the group consisting of phenol-formaldehyde foam, urea-formaldehyde foam, polyurethane foam, glass fibers, glass foam, bonded peat fibers, and bonded cellulose fibers.

3. The body of claim 2 wherein the conduits are cylindrical and have diameters in the range 1–5 mm.

4. The body of claim 3 wherein the body is disposed in an open topped container with soil disposed in the container above the body.

5. The body of claim 4 wherein the conduits extend vertically completely through the body.

6. The body of claim 1 wherein the conduits are cylindrical and have diameters in the range 1–5 mm.

7. The body of claim 6 wherein the body is disposed in an open topped container with soil disposed in the container above the body.

8. The body of claim 6 wherein the conduits extend vertically completely through the body.

9. The body of claim 1 wherein the conduits extend vertically completely through the body.

10. A process for improving the growth of plants in substrates, preventing the substrates from retaining too great a quantity of water, and assuring a supply of oxygen to the roots of the plants comprising,
    providing a foraminous substrate defined by an external surface, said substrate having the property of absorbing and retaining water,
    forming conduits in substrate having a cross-sectional area in the range 0.8 to 19.6 square millimeters, the external surface edge of each said conduit defining an opening, each said opening being spaced from the other openings a distance in the range 1–8 millimeters, the volume of the conduits being about 6–53% of the volume of the substrate,
    providing a plant which extends its roots into said substrate, and
    providing water to the body;
    whereby, in conjunction with the provision of said water, adequate oxygen and moisture simultaneously are derived at said roots and plant gases are effectively dissipated.

* * * * *

UNITED STATES PATENT AND TRADEMARK OFFICE
CERTIFICATE OF CORRECTION

PATENT NO. : 4,023,308
DATED : May 17, 1977
INVENTOR(S) : George L. Staby

It is certified that error appears in the above-identified patent and that said Letters Patent are hereby corrected as shown below:

Column 1, line 57: should read --have published treatises in--- rather than "have published threatises in";

Column 1, line 63: should read ---invention such are incorporated herein--- rather than "invention such as incorporated herein";

Column 2, line 13: should read ---or conduits, 1-5mm in nominal diameter--- rather than "or conduits, 1-5 in nominal diameter";

Column 6, line 51: should read ---about 305g of water--- rather than "about 305G of water";

Column 8, line 32: should read ---conduits in said substrate--- rather than "conduits in substrate";

UNITED STATES PATENT AND TRADEMARK OFFICE
CERTIFICATE OF CORRECTION

PATENT NO. : 4,023,308
DATED : May 17, 1977
INVENTOR(S) : George L. Staby

It is certified that error appears in the above-identified patent and that said Letters Patent are hereby corrected as shown below:

Column 3, line 65: should read---placing a foraminous--- rather than "placing a formanious";

Column 7, line 3: should read ---These data are significant--- rather than "These date are significant";

Column 7, line 41: should read ---to 19.6 square millimeters--- rather than "to 19.4 square millimeters";

Column 7, line 43: should read ---in the range 1-8--- rather than "in the range 1-9";

Signed and Sealed this thirtieth Day of August 1977

[SEAL]

Attest:

RUTH C. MASON
Attesting Officer

C. MARSHALL DANN
Commissioner of Patents and Trademark